US008891784B2

(12) United States Patent
Gratke

(10) Patent No.: US 8,891,784 B2
(45) Date of Patent: Nov. 18, 2014

(54) MICROPHONE ASSEMBLY FOR USE WITH AN AFTERMARKET TELEMATICS UNIT

(75) Inventor: Jesse T. Gratke, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 759 days.

(21) Appl. No.: 12/830,928

(22) Filed: Jul. 6, 2010

(65) Prior Publication Data

US 2012/0008794 A1 Jan. 12, 2012

(51) Int. Cl.

| | |
|---|---|
| ***H04B 1/00*** | (2006.01) |
| ***H04R 1/02*** | (2006.01) |
| ***H04R 3/00*** | (2006.01) |
| ***H04R 1/20*** | (2006.01) |
| ***H04R 9/08*** | (2006.01) |
| ***H04R 1/40*** | (2006.01) |

(52) U.S. Cl.

CPC .................................... *H04R 1/406* (2013.01)
USPC ............... 381/86; 381/91; 381/111; 381/354; 381/356

(58) Field of Classification Search

CPC ............ H04R 5/02; H04R 1/08; H04R 1/406; H04R 1/34; H04R 1/342; H04R 1/083; H04R 1/086; H04R 19/04; H04R 1/38; H04R 9/08; H04R 19/106; H04R 1/04; B60R 11/0217; H04B 1/082; H04B 1/20; H03G 3/32
USPC ......... 381/86, 91, 92, 122, 87, 354, 365, 356, 381/361, 369, 337, 339, 345, 351, 111–117
See application file for complete search history.

(56) References Cited

U.S. PATENT DOCUMENTS

| | | | | |
|---|---|---|---|---|
| 6,201,804 | B1 | 3/2001 | Kikinis | |
| 6,505,100 | B1 | 1/2003 | Stuempfle et al. | |
| 6,633,647 | B1 * | 10/2003 | Markow et al. | ................. 381/92 |
| 6,654,669 | B2 | 11/2003 | Eisenmann et al. | |

(Continued)

FOREIGN PATENT DOCUMENTS

| | | | |
|---|---|---|---|
| CN | 1681340 | A | 10/2005 |
| CN | 1877350 | A | 12/2006 |

(Continued)

OTHER PUBLICATIONS

USPTO, U.S. "Non-Final Office Action" mailed Nov. 14, 2012 for U.S. Appl. No. 12/851,025, filed Aug. 5, 2010.

(Continued)

*Primary Examiner* — Vivian Chin
*Assistant Examiner* — David Ton
(74) *Attorney, Agent, or Firm* — Ingrassia Fisher & Lorenz, P.C.

(57) ABSTRACT

A microphone assembly for use with an aftermarket telematics unit mounted in a passenger compartment of a vehicle is disclosed herein. The aftermarket telematics unit has a chamber having an opening that generally faces towards a rear of the vehicle and the microphone assembly includes, but is not limited to, a directional wideband microphone disposed within the chamber. A preamplifier is internally mounted within the directional wideband microphone. The preamplifier has an electrical lead and is both electrically and structurally attached to the aftermarket telematics unit via the electrical lead. The electrical lead is the sole means of physical attachment between the directional wideband microphone and the preamplifier, on the one hand, and the aftermarket telematics unit on the other hand.

20 Claims, 3 Drawing Sheets

(56) References Cited

U.S. PATENT DOCUMENTS

| | | | | |
|---|---|---|---|---|
| 6,690,268 | B2 | 2/2004 | Schofield et al. | |
| 6,902,284 | B2 | 6/2005 | Hutzel et al. | |
| 6,906,632 | B2 | 6/2005 | DeLine et al. | |
| 7,171,187 | B2 | 1/2007 | Haave et al. | |
| 7,257,426 | B1 | 8/2007 | Witkowski et al. | |
| 7,277,736 | B2 | 10/2007 | Oesterling et al. | |
| 7,299,076 | B2 | 11/2007 | Dunn, Jr. et al. | |
| 7,346,374 | B2 | 3/2008 | Witkowski et al. | |
| 7,349,722 | B2 | 3/2008 | Witkowski et al. | |
| 7,904,023 | B2 | 3/2011 | Viitamäki et al. | |
| 7,970,446 | B2 | 6/2011 | Witkowski et al. | |
| 8,194,133 | B2 | 6/2012 | Dewind et al. | |
| 2002/0197955 | A1 | 12/2002 | Witkowski et al. | |
| 2004/0127206 | A1 | 7/2004 | Van Bosch et al. | |
| 2004/0198466 | A1 | 10/2004 | Walby et al. | |
| 2004/0203379 | A1 | 10/2004 | Witkowski et al. | |
| 2004/0209655 | A1 | 10/2004 | Kubo | |
| 2004/0267419 | A1 | 12/2004 | Jeng | |
| 2005/0032550 | A1 | 2/2005 | Baratono et al. | |
| 2005/0136991 | A1 | 6/2005 | Oesterling et al. | |
| 2005/0273211 | A1 | 12/2005 | McGarry et al. | |
| 2006/0035590 | A1 | 2/2006 | Morris et al. | |
| 2006/0261932 | A1 | 11/2006 | Ando et al. | |
| 2007/0047753 | A1* | 3/2007 | Watson et al. | 381/365 |
| 2007/0058821 | A1 | 3/2007 | Welsh et al. | |
| 2008/0045274 | A1 | 2/2008 | Witkowski et al. | |
| 2008/0080076 | A1* | 4/2008 | Hutzel et al. | 359/871 |
| 2008/0137895 | A1* | 6/2008 | Gratke et al. | 381/359 |
| 2008/0174414 | A1 | 7/2008 | McCarthy et al. | |
| 2009/0097674 | A1 | 4/2009 | Watson et al. | |
| 2009/0208058 | A1 | 8/2009 | Schofield et al. | |
| 2009/0284391 | A1 | 11/2009 | Berkobin et al. | |
| 2009/0319121 | A1 | 12/2009 | MacDonald et al. | |
| 2009/0319341 | A1 | 12/2009 | Berkobin et al. | |
| 2010/0023198 | A1 | 1/2010 | Hamilton | |
| 2011/0227698 | A1 | 9/2011 | Witkowski et al. | |
| 2012/0005395 | A1 | 1/2012 | Lydon et al. | |
| 2012/0083209 | A1 | 4/2012 | Giles et al. | |
| 2012/0236152 | A1 | 9/2012 | Dewind et al. | |

FOREIGN PATENT DOCUMENTS

| | | | |
|---|---|---|---|
| CN | 101345950 | A | 1/2009 |
| CN | 101570087 | A | 11/2009 |
| EP | 0719674 | A2 | 7/1996 |
| JP | 2003278418 | A | 10/2003 |
| KR | 20060039200 | A | 5/2006 |

OTHER PUBLICATIONS

USPTO, U.S. "Non-Final Office Action" mailed Nov. 28, 2012 for U.S. Appl. No. 12/845,848, filed Jul. 29, 2010.

USPTO, U.S. "Notice of Allowance" mailed Sep. 19, 2012 for U.S. Appl. No. 12/845,822, filed Jul. 29, 2010.

German Patent & Trademark Office. German Office Action dated Nov. 20, 2012 for Application No. 10 2011 106 073.5

Christensen, J. et al., "Method of Unauthorized Vehicle Movement Detection," U.S. Appl. No. 12/787,472, filed May 26, 2010.

USPTO, U.S. "Non-Final Office Action" mailed May 4, 2012 for U.S. Appl. No. 12/845,822, filed Jul. 29, 2010.

USPTO, U.S. Non-Final Office Action mailed Jan. 18, 2013 for U.S. Appl. No. 12/895,066, filed Sep. 30, 2010.

German Patent and Trade Mark Office, Office Action in German Patent Application No. 10 2011 108 365.4, mailed May 3, 2013.

USPTO, Notice of Allowance and Fee(s) Due for U.S. Appl. No. 12/845,848, mailed Mar. 28, 2013.

USPTO, Notice of Allowance and Fee(s) Due for U.S. Appl. No. 12/895,066, mailed May 31, 2013.

USPTO, Notice of Allowance and Fee(s) Due for U.S. Appl. No. 12/851,025, mailed Jun. 25, 2013.

USPTO, Notice of Allowance and Fee(s) Due for U.S. Appl. No. 12/899,808, mailed Feb. 14, 2013.

USPTO, Final Office Action for U.S. Appl. No. 121851,025, mailed Feb. 21, 2013.

State Intellectual Property Office of the P.R.C., Office Action in Chinese Patent Application No. 201110187791.X, mailed Jul. 25, 2013.

State Intellectual Property Office of the P.R.C., Office Action in Chinese Patent Application No. 201110297599.6, mailed Nov. 29, 2013.

Chinese Patent and Trade Mark Office, Office Action for Chinese Patent Application No. 201110223613.8, mailed Sep. 26, 2013.

USPTO, Response to Office Action for U.S. Appl. No. 13/011,638, mailed Dec. 11, 2013.

USPTO, Non-Final Office Action for U.S. Appl. No. 13/011,638, mailed Apr. 4, 2014.

State Intellectual Property Office of the Peoples' Republic of China, Office Action in Chinese Patent Application No. 201210018629.X, mailed Feb. 7, 2014.

Chinese Patent and Trade Mark Office, Office Action for Chinese Patent Application No. 201110187791.X, mailed Mar. 13, 2014.

State Intellectual Property Office of the Peoples' Republic of China, Decision on Rejection for Chinese Patent Application No. 201110187791.X, mailed Aug. 4, 2014.

USPTO, Response to Office Action for U.S. Appl. No. 13/011,638, mailed Jul. 7, 2014.

USPTO, Final Office Action for U.S. Appl. No. 13/011,638, mailed Aug. 8, 2014.

* cited by examiner

MICROPHONE ASSEMBLY FOR USE WITH AN AFTERMARKET TELEMATICS UNIT

TECHNICAL FIELD

The technical field generally relates to microphone assemblies, and more particularly relates to microphone assemblies for use with an aftermarket telematics unit.

BACKGROUND

Telematics services are those services that are provided by a remotely located call center to a vehicle and/or to an operator of the vehicle via an automatic and/or on-demand communications link connecting the call center to the vehicle. The use of telematics services by vehicle operators has grown steadily since such services first became available. Some of the more common telematics services include, but are not limited to, turn-by-turn navigation guidance, assistance during times of emergency, cellular telephone services, and the remote monitoring of a vehicle's maintenance requirements.

A vehicle that is capable of providing its driver with such telematics services typically includes an embedded telematics unit that is integrated into the vehicle and that is configured to communicate with the remotely located call center. The remotely located call center is configured, equipped and staffed to provide the above services (as well as others) to a vehicle operator through communications with the vehicle and/or the driver via the embedded telematics unit.

In a typical example, the driver will press a button or other control device in the vehicle requesting assistance from the call center. The button press will cause the embedded telematics unit to initiate a cellular telephone call to the call center. After an initial exchange of data between the telematics unit and the call center, voice communications will be established to permit an advisor at the call center to speak with the driver. To facilitate such voice communications, a directional wideband microphone having a wideband frequency response is included in the vehicle and is communicatively connected to the telematics unit.

The location where the directional wideband microphone is positioned in the vehicle has evolved over the years. Initially, the directional wideband microphone was mounted to the rear view mirror. In some instances, it was mounted to the bottom of the mirror and in other instances, it was mounted to the top. While both locations were acceptable, they each had drawbacks. The position beneath the mirror placed the directional wideband microphone close to the vehicle's stereo speakers and the vehicle's heating, ventilation, and air conditioning (HVAC) ducts, each of which emitted sound when utilized. The position above the mirror resulted in the directional wideband microphone's acoustic axis being directed up into the vehicle's headliner which is an inherently sound deadening material. Accordingly, both locations could potentially interfere with the directional wideband microphone's receptivity to sound energy, and could, as a result, diminish the microphone's ability to detect the vehicle occupant's voice.

Because of these drawbacks, designers began to explore positioning the directional wideband microphone at locations other than in or on the mirror. For example, directional wideband microphones were mounted in overhead consoles and in A-pillars. By positioning the directional wideband microphones in these locations, designers achieved better results, i.e., the directional wideband microphones experienced less interference from the radio and the HVAC ducts and therefore better maintained their wideband receptivity.

Because of the popularity of the above described telematics services, aftermarket telematics units are beginning to enter the market place. Such aftermarket telematics units make it possible for drivers of vehicles that lack an embedded telematics unit to, nevertheless, receive some or all of the telematics services available to drivers having vehicles with embedded telematics units. These aftermarket telematics units are self contained units that have many or all of the components of an embedded telematics unit.

Many of these aftermarket telematics units are in the form of a rear view mirror and are intended to replace the rear view mirror that comes with the vehicle. These aftermarket telematics units also include a directional wideband microphone to facilitate voice communications between the driver of the vehicle and the call center. The directional wideband microphones mounted in such aftermarket telematics units may therefore encounter the same sources of noise and interference that previously lead designers to move the directional wideband microphones out of the mirrors to other parts of the vehicle interior.

Another consideration is the effect that the packaging/mounting of the directional wideband microphone will have on the microphone's wideband receptivity. It has been observed that the greater the number of attachment points or the greater the area of attachment between a wideband microphone and the body to which it is mounted, the more vibrations from vehicle and vehicle systems will interfere with the directional wideband microphone's wideband receptivity. Because existing directional wideband microphone assemblies are packaged in a rigid housing made of hard plastic, and because the housings are relatively large, simply inserting the microphone assembly into the aftermarket telematics unit may result in large areas of contact between rigid, vibration transmitting surfaces.

SUMMARY

A microphone assembly is disclosed herein for use with an aftermarket telematics unit mounted in a passenger compartment of a vehicle. The aftermarket telematics unit has a chamber having an opening that generally faces towards a rear of the vehicle.

In a non-limiting example, the microphone assembly includes, but is not limited to, a directional wideband microphone disposed within the chamber. A preamplifier is mounted at least partially within the directional wideband microphone. The preamplifier has an electrical lead for both electrically connecting and structurally attaching to the aftermarket telematics unit. The directional wideband microphone and the preamplifier are fixed to the aftermarket telematics unit solely via the electrical lead.

In another non-limiting example, wherein the aftermarket telematics unit further includes a Printed Circuit Board (PCB board) to control various functions of the aftermarket telematics unit, the microphone assembly includes, but is not limited to, a directional wideband microphone that is disposed within the chamber. A preamplifier is mounted at least partially within the directional wideband microphone. The preamplifier has an electrical lead for both electrically connecting and structurally attaching to the PCB board. The directional wideband microphone and the preamplifier are fixed to the aftermarket telematics unit solely via the electrical lead.

In another non-limiting example, wherein the aftermarket telematics unit further includes a PCB board to control various functions of the aftermarket telematics unit, the microphone assembly includes, but is not limited to, a directional wideband microphone disposed within the chamber and having an acoustic axis. The directional wideband microphone is oriented within the chamber such that the acoustic axis is directed through the opening and towards the rear of the vehicle. A preamplifier is mounted at least partially within the directional wideband microphone. The preamplifier has an electrical lead for both electrically connecting and structurally attaching to the aftermarket telematics unit. A grill member is positioned to cover the opening. The grill member has a plurality of grill openings that are sized to render the grill member acoustically transparent. A foam body is disposed within the chamber. The foam body is positioned between the directional wideband microphone and the opening. The foam body has a density that is effective to resist a transmission of sound energy of a predetermined frequency. A boot is positioned around the directional wideband microphone. The boot is acoustically transparent. The boot comprises an elastomeric material. An outer surface of the boot is contoured to substantially conform to an internal portion of the chamber. The directional wideband microphone and the preamplifier are fixed to the aftermarket telematics unit solely via the electrical lead. The directional wideband microphone is disposed within the chamber such that a rear surface of the directional wideband microphone is spaced apart from any other surface by at least two millimeters.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved microphone assembly for use with an aftermarket telematics unit is disclosed herein. In a non-limiting example, the microphone assembly includes a directional wideband microphone that is mounted in an aftermarket telematics unit. The aftermarket telematics unit includes a chamber extending inwardly from a front surface of the aftermarket telematics unit. A preamplifier, including an electrical lead, is mounted within the directional wideband microphone. The directional wideband microphone is positioned within the chamber and the electrical lead is attached to the aftermarket telematics unit. The electrical lead, or leads if more than one electrical lead is present, is/are the sole point of attachment, both structurally and electrically, between the directional wideband microphone and the preamplifier, on the one hand, and the aftermarket telematics unit on the other hand.

The placement of the directional wideband microphone in a chamber having an opening that faces towards the rear of the vehicle (i.e., towards the passenger compartment in cases where the aftermarket telematics unit comprises a rear view mirror) helps to ensure good sound receptivity and thus avoids the drawbacks associated with mounting the microphone assembly on top of, or underneath, the rear view mirror, as discussed above. The minimal area of attachment between the directional wideband microphone and the aftermarket telematics unit helps to minimize the amount of vibration that is transferred from the aftermarket telematics unit to the directional wideband microphone.

A greater understanding of the examples of the directional wideband microphone assembly for use with an aftermarket telematics unit disclosed herein may be obtained through a review of the illustrations accompanying this application together with a review of the detailed description that follows.

Figure 1:
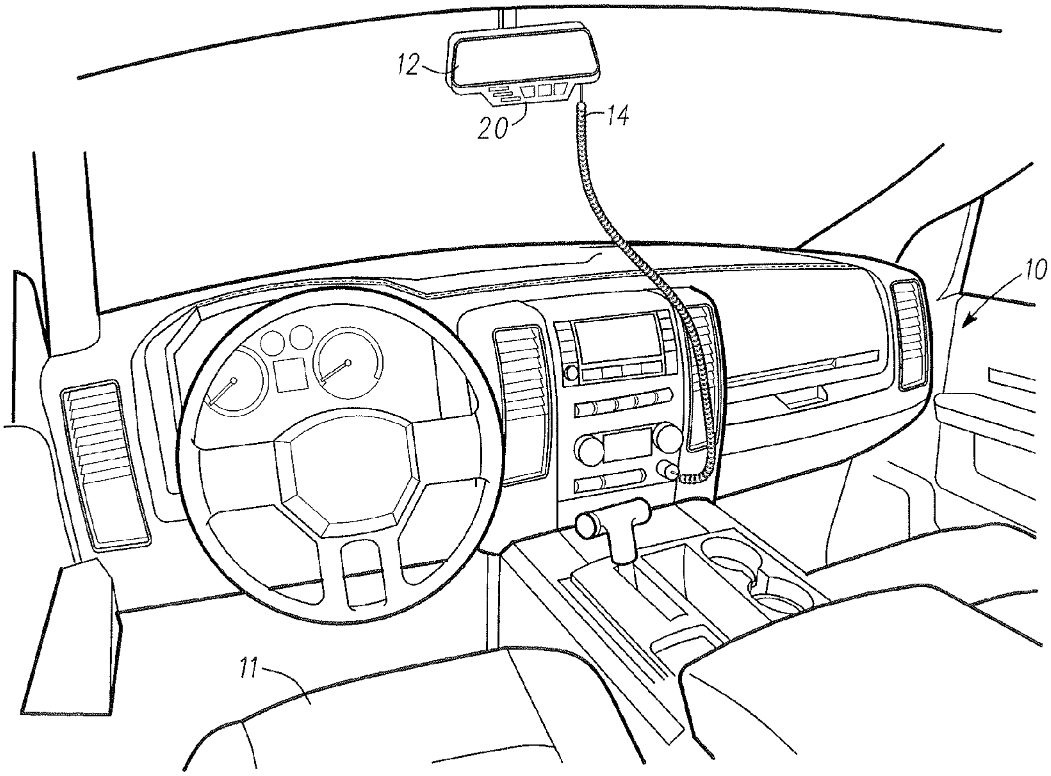
FIG. 1 is a perspective view illustrating an interior of a vehicle equipped with an aftermarket telematics unit having an example of a microphone assembly disclosed herein.

FIG. 1 is a perspective view illustrating an interior 10 of a vehicle. Although interior 10 is illustrated as the interior of a passenger vehicle, it should be understood that telematics unit 12, and the microphone assembly contained therein, may be used in any type of vehicle, including, but not limited to, commercial vehicles, trucks, recreational vehicles, construction related vehicles, or any other type of automobile. A driver seat 11 is mounted within interior 10 and is configured to support a human occupant. Interior 10 is further equipped with an aftermarket telematics unit 12 positioned forward of driver seat 11. Aftermarket telematics unit 12 includes an example of a microphone assembly disclosed herein.

Aftermarket telematics unit 12 is a self contained telematics unit that is compatible with a communication system that is configured to communicatively connect a vehicle to a call center (not shown). The call center is configured to provide several automatic and on-demand services for the vehicle and for an occupant/owner of the vehicle. A communication system of the sort that aftermarket telematics unit 12 is compatible with is disclosed in a pending U.S. patent application having the Ser. No. 12/548,148 filed on Aug. 26, 2009 and Ser. No. 12/683,040 filed on Jan. 6, 2010, each of which is hereby incorporated herein by reference in its entirety. Aftermarket telematics units are disclosed in a pending U.S. patent application having the Ser. No. 12/787,472 filed on May 26, 2010, and in U.S. Publication No. 2005/0273211 published on Dec. 8, 2005, each of which is hereby incorporated herein by reference in its entirety.

In FIG. 1, aftermarket telematics unit 12 is configured as a windshield-mounted rear-view mirror. In other examples, aftermarket telematics unit 12 may take any other suitable form, including, but not limited to, a navigation system, a radio, a cellular telephone, a portable device, or any other component configured to be mounted within interior 10.

Aftermarket telematics unit 12 includes a power cord 14 that is adapted to draw power from an electrical outlet mounted within interior 10. In other examples, aftermarket telematics unit 12 may be battery operated or may draw electrical power from some other source.

In the example illustrated in FIG. 1, a grill 20 is positioned over an opening into a chamber that extends inwardly into aftermarket telematics unit 12. The microphone assembly of the present disclosure is mounted within the chamber and grill 20 closes the chamber to protect the microphone assembly and other components from dust, particulates, debris, and other contaminants.

Figure 2:
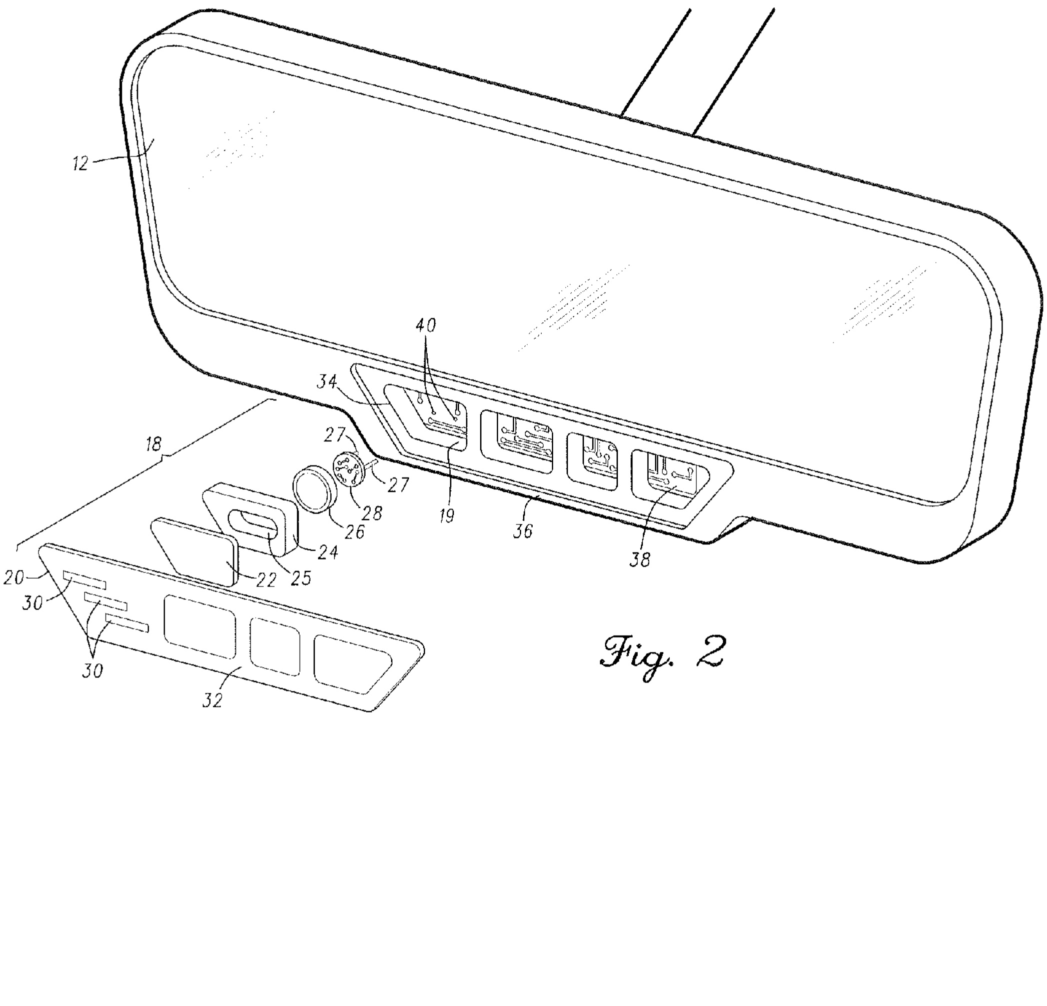
FIG. 2 is an exploded view illustrating the components of the microphone assembly embedded in the aftermarket telematics unit of FIG. 1.

FIG. 2 is an exploded view illustrating the components of a microphone assembly 18 mounted within a chamber 19 in the aftermarket telematics unit of FIG. 1. In the illustrated example, microphone assembly 18 includes grill 20, foam body 22, a boot 24, a directional wideband microphone 26, and a preamplifier 28. In other examples a greater or lesser number of components may be included without departing from the teachings herein. For instance, in some examples, microphone assembly 18 may include only directional wideband microphone 26 and preamplifier 28, while in other examples, microphone assembly 18 may include each of the illustrated components plus a mesh cloth disposed between foam body 22 and grill 20.

Grill 20 may comprise a plastic material, a metal material, or any other material that is conducive to the transmission of sound to directional wideband microphone 26. Grill 20 includes three substantially parallel slots 30 defined in a surface 32 of grill 20 and extending completely through grill 20. These three substantially parallel slots provide an unobstructed pathway for the transmission of sound through grill 20 to directional wideband microphone 26.

When the combined open area of substantially parallel slots 30 exceeds a certain magnitude, grill 20 will be acoustically transparent, meaning that the amount of sound energy that will reach directional wideband microphone 26 after passing through grill 20 is substantially equal to the amount of sound energy that would reach directional wideband microphone 26 if grill 20 were not present. It has been observed that, in some examples, when the combined open area of substantially parallel slots 30 is equal to or exceeds 41.3 $mm^2$, then grill 20 will be acoustically transparent. It should be understood that openings in grill 20 having other configurations may also be employed without departing from the teachings of the present disclosure. Furthermore, such other configurations may provide a combined opening that is sufficiently large to render grill 20 acoustically transparent. For example, it has been observed that an arrangement of small, circular openings having a combined open area of 37.7 $mm^2$ will render grill 20 acoustically transparent.

Foam body 22 is a foam component that is disposed within chamber 19 and positioned between grill 20 and a front portion of directional wideband microphone 26. Foam body 22 is configured to provide acoustic resistance to sound energy passing through chamber 19. The presence of foam body 22 in front of directional wideband microphone 26 in chamber 19 serves to dampen any echoes and/or reverberation caused by sound reflecting off of the walls of chamber 19. In some examples, foam body 22 may have a density that is more resistive to sound energy propagating at a specific frequency than sound energy propagating at other frequencies. This allows a designer to tune microphone assembly 18 to partially filter out sound of a specific or undesirable frequency. Due to the directional nature of directional wideband microphone 26, it may be desirable to avoid positioning foam body 22, or any portion thereof, behind directional wideband microphone 26.

Boot 24 is a housing that is configured to receive directional wideband microphone 26. In the illustrated example, boot 24 is configured and contoured to substantially conform to the shape of chamber 19. In this way, boot 24 holds directional wideband microphone 26 in a desired position and orientation within chamber 19, and inhibits movement of directional wideband microphone 26 from such desired position and orientation despite the occurrence of jostling and turbulence such as is typically experienced and encountered by components mounted to a vehicle. Furthermore, to avoid transmitting vibrations from the vehicle to directional wideband microphone 26, boot 24 is preferably made from an elastomeric or rubber material, and is therefore suitable for absorbing such vibrations before they can reach directional wideband microphone 26.

Boot 24 includes an opening 25 that extends completely through boot 24. Opening 25 permits front and rear portions of directional wideband microphone 26 to receive sound energy in an unobstructed manner and therefore avoids adversely impacting the ability of directional wideband microphone 26 to receive sound energy. Accordingly, boot 24 is acoustically transparent when directional wideband microphone 26 is seated within boot 24.

Figure 4:
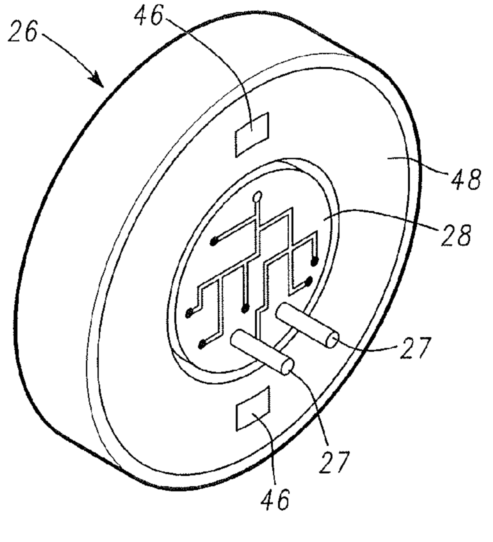
FIG. 4 is a perspective view illustrating a rear portion of the directional wideband microphone of FIG. 3 and internally mounted preamplifier of FIG. 3.
Figure 5:
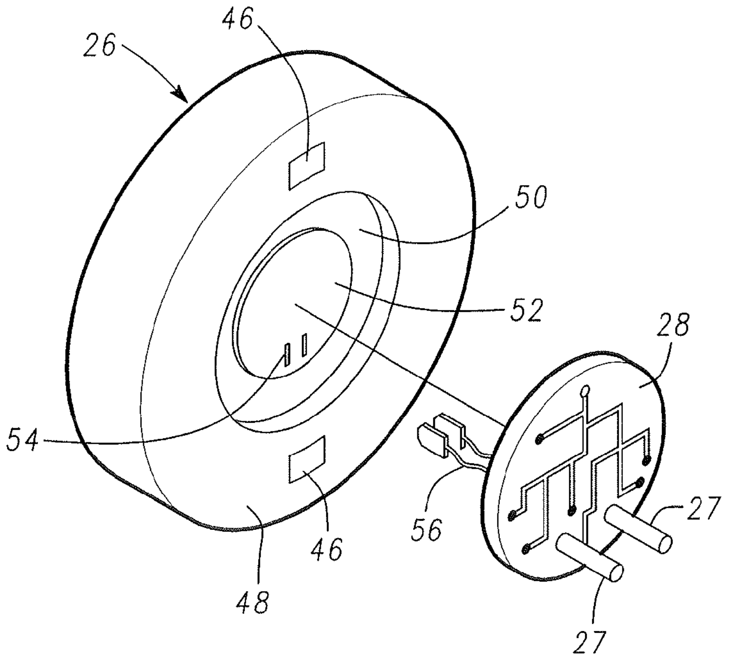
FIG. 5 is an exploded view illustrating an arrangement between the directional wideband microphone and the internally mounted preamplifier.

In the illustrated example, directional wideband microphone 26 is an electret condenser microphone that is configured to receive sound energy at both a front surface (visible in FIG. 2) and a rear surface (as best seen in FIGS. 4 and 5). Directional wideband microphones of the type illustrated in FIG. 2 are widely available in the market place. One known manufacturer, GoerTek, sells a suitable directional wideband microphone under the model number B9750UP123-11. As is well known in the microphone arts, directional wideband microphones are configured to discern time lapses between the receipt of sound energy from its front and rear surfaces, and to process signals corresponding to the sound energy received at both the front and rear surfaces in a manner that permits directional wideband microphones to be more attuned to, and to be better able to detect sounds transmitted from a specific direction. The direction in which a directional wideband microphone is more attuned and better able to detect sounds is referred to herein as a directional wideband microphone's "acoustic axis". In the illustrated example, directional wideband microphone 26 has an acoustic axis that extends generally perpendicularly to a front face of directional wideband microphone 26. Accordingly, when seated within chamber 19, the acoustic axis is directed through grill 20 and towards a rear portion of interior 10.

Preamplifier 28 serves to amplify a low-level signal such as is commonly generated by a microphone. Preamplifier's typically provide a voltage gain without any significant current gain and are commonly incorporated into the housing or chassis of the amplifier that they feed. Preamplifiers of the type illustrated in FIG. 2 are widely available in the market place. As discussed below, preamplifier 28 is mounted within, and is electrically connected to, directional wideband microphone 26. Preamplifier 28 includes a pair of electrical leads 27 which are configured to carry power and electronic signals between preamplifier 28 and aftermarket telematics unit 12.

In the illustrated example, aftermarket telematics unit 12 is configured as a rear view mirror and includes chamber 19 extending inward into aftermarket telematics unit 12. Chamber 19 has an opening 34 defined in a front face 36 of aftermarket telematics unit 12. As a result of this configuration, when aftermarket telematics unit 12 is mounted in interior 10, opening 34 faces generally towards the rear of interior 10. Consequently, microphone assembly 18 is mounted such that it generally faces towards an occupant of driver seat 11.

Aftermarket telematics unit 12 includes a PCB board 38 that, in some examples, is configured to control operations of aftermarket telematics unit 12. PCB board 38 includes a connector 40 comprising a pair of openings that are configured to receive electrical leads 27. Once electrical leads 27 are inserted into connector 40, directional wideband microphone 26 and preamplifier 28 are electrically connected to aftermarket telematics unit 12 and physically attached thereto. To minimize the transmission of vibrations from aftermarket telematics unit 12 to directional wideband microphone 26, this connection between electrical leads 27 and connector 40 is the sole means of physical attachment between directional wideband microphone 26 and preamplifier 28, on the one hand, and aftermarket telematics unit 12 on the other hand. Accordingly, wideband microphone 26 and preamplier 28 are essentially suspended within chamber 19 via electrical leads 27. Electrical leads 27 may be permanently affixed to PCB board 38 such as through the use of a solder joint. For example, electrical leads 27 may protrude through PCB board 38 and solder may be applied to attach the end portions of electrical leads 27 to a rear portion of PCB board 38. In other examples, lead wires may be attached (e.g. soldered) to electrical leads 27 and then electrical connectors may be affixed to the lead wires. The electrical connectors may then be attached to a connector on PCB board 38. In some examples, intermediate connectors may be employed to connect the electrical connectors of electrical leads 27 to an electrical connector mounted to PCB board 38.

Figure 3:
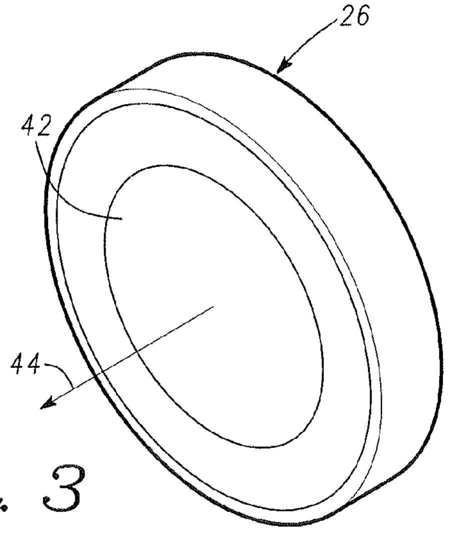
FIG. 3 is a perspective view illustrating a front portion of the directional wideband microphone illustrated in FIG. 2.

FIG. 3 is a perspective view illustrating a front portion of directional wideband microphone 26 and preamplifier 28. Directional wideband microphone includes a diaphragm 42 incorporated into a front surface. Diaphragm 42 vibrates in response to sound waves that impacts diaphragm 42 and generates a corresponding electronic signal. Acoustic axis 44 projects outwardly from directional wideband microphone 26 in an orientation that is substantially perpendicular to diaphragm 42.

FIG. 4 is a perspective view illustrating a rear portion of directional wideband microphone 26 and internally mounted preamplifier 28. With continuing reference to FIG. 3, openings 46 are defined in a rear surface 48 to receive sound energy reaching a rear portion of directional wideband microphone 26. Directional wideband microphone 26 is configured to employ a sound cancelling technique that utilizes the sound energy entering through openings 46 to form an acoustic axis 44 that extends outwardly from diaphragm 42 in a direction that is generally transverse to diaphragm 42.

FIG. 5 is an exploded view illustrating an arrangement between directional wideband microphone 26 and preamplifier 28. As illustrated, directional wideband microphone 26 includes an opening 50 configured to receive preamplifier 28. In some examples, preamplifier 28 may snap-fit into opening 50. In other examples, an adhesive may be used to mount preamplifier to directional wideband microphone 26. In other examples, any suitable type of fastening may be employed.

In addition, directional wideband microphone 26 includes an electrical connector 52 including a pair of plug openings 54 that are configured to receive a pair of electrical connectors 56. Once electrical connectors 56 are received within plug openings 54, directional wideband microphone 26 and preamplifier 28 are electrically connected and signals may be sent by directional wideband microphone 26 and received by preamplifier 28.

Figure 6:
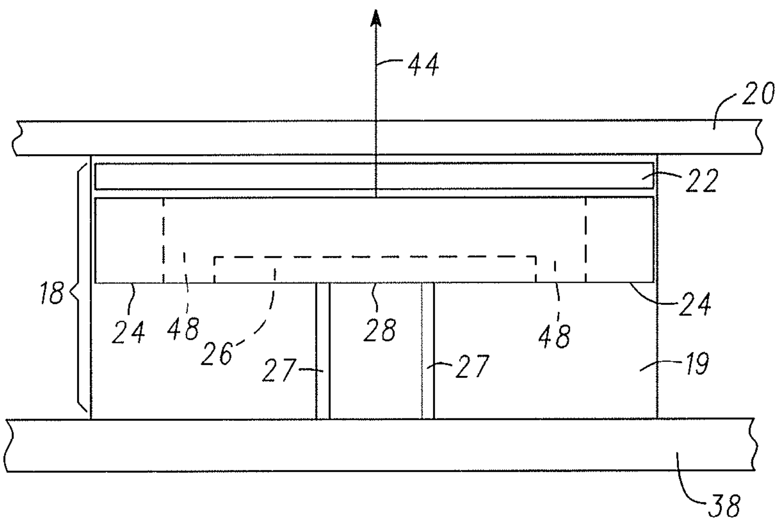
FIG. 6 is a schematic top view illustrating an example of a microphone assembly made in accordance with the teachings herein.

FIG. 6 is a schematic top view illustrating an example of microphone assembly 18. In this illustration it can be seen that there are substantially no components positioned within chamber 19 that are disposed between rear surface 48 of directional wideband microphone 26 and PCB board 38. By keeping this region substantially free of components and other matter, there is nothing to obstruct the transmission of sound energy into openings 46 (see FIGS. 4 and 5). Such unobstructed space avoids interfering with the directional characteristics of directional wideband microphone 26. In some examples, it has been observed that when the distance between rear surface 48 and PCB board 38 is at least two millimeters, the directional characteristics of directional wideband microphone 26 will not be negatively affected.

When microphone assembly 18 is situated in chamber 19 in the manner illustrated, a front surface of directional wideband microphone 26 faces in the direction of grill 20 and acoustic axis 44 is projected through grill 20 and towards a rear portion of interior 10. As a result of this orientation, acoustic axis 44 is generally directed towards an occupant of driver seat 11 and is therefore better able to discern voice commands coming from a driver or occupant of the vehicle.

While at least one example has been presented in the foregoing detailed description, it should be appreciated that a vast number of variations exist. It should also be appreciated that the examples shown and described are not intended to limit the scope, applicability, or configuration in any way. Rather, the foregoing detailed description will provide those skilled in the art with a convenient road map for implementing the examples discussed herein. It should be understood that various changes can be made in the function and arrangement of elements without departing from the scope as set forth in the appended claims and the legal equivalents thereof.

What is claimed is:

1. A microphone assembly for use with an aftermarket telematics unit mounted in a passenger compartment of a vehicle, the aftermarket telematics unit having a chamber having an opening that generally faces towards a rear of the vehicle, the microphone assembly comprising:

a directional wideband microphone disposed within the chamber, and a preamplifier mounted at least partially within the directional wideband microphone, the preamplifier having a pair of electrical leads for both electrically connecting and structurally attaching to the aftermarket telematics unit, wherein the directional wideband microphone and the preamplifier are mounted to the aftermarket telematics unit via the pair of electrical leads such that the pair of electrical leads are the sole points of attachment of the directional wideband microphone and the preamplifier with the aftermarket telematics unit, wherein each electrical lead of the pair of electrical leads are spaced apart from one another, and wherein the pair of electrical leads cooperate to stand off a rear surface of the directional wideband microphone and a rear surface of the preamplifier from a surface of the aftermarket telematics unit.

2. The microphone assembly of claim 1, wherein the directional wideband microphone has an acoustic axis and wherein the directional wideband microphone is oriented within the chamber such that the acoustic axis is directed through the opening and towards the rear of the vehicle in a direction that is at least substantially perpendicular to a front face of the directional wideband microphone.

3. The microphone assembly of claim 1, further comprising a grill member positioned to cover the opening, the grill member having a plurality of grill openings that are sized to render the grill member acoustically transparent.

4. The microphone assembly of claim 3, wherein the plurality of grill openings comprise substantially parallel slots.

5. The microphone assembly of claim 4, wherein the substantially parallel slots have a combined open area of at least 41.3 $mm^2$.

6. The microphone assembly of claim 3, wherein the plurality of grill openings comprises a plurality of circular openings having a combined open area of at least 37.7 $mm^2$.

7. The microphone assembly of claim 1, wherein the directional wideband microphone is disposed within the chamber such that a rear surface of the directional wideband microphone is spaced apart from any other surface.

8. The microphone assembly of claim 7, wherein the directional wideband microphone is spaced apart from any other surface by at least two millimeters.

9. The microphone assembly of claim 1, further comprising a foam body disposed within the chamber, the foam body being positioned between the directional wideband microphone and the opening.

10. The microphone assembly of claim 9, wherein the foam body has a density that is effective to resist a transmission of sound energy of a predetermined frequency.

11. The microphone assembly of claim 1, further comprising a boot positioned around the directional wideband microphone, the boot being acoustically transparent and comprising an elastomeric material.

12. The microphone assembly of claim 11, wherein an outer surface of the boot is contoured to substantially conform to an internal portion of the chamber.

13. A microphone assembly for use with an aftermarket telematics unit mounted in a passenger compartment of a vehicle, the aftermarket telematics unit having a Printed Circuit Board (PCB board) to control various functions of the aftermarket telematics unit, the aftermarket telematics unit further having a chamber having an opening that generally faces towards a rear of the vehicle, the microphone assembly comprising:

a directional wideband microphone disposed within the chamber, and a preamplifier mounted at least partially within the directional wideband microphone, the preamplifier having a pair of electrical leads for both electrically connecting and structurally attaching to the PCB board, wherein the directional wideband microphone and the preamplifier are mounted to the aftermarket telematics unit via the pair of electrical leads such that the pair of electrical leads are the sole points of attachment of the directional wideband microphone and the preamplifier with the aftermarket telematics unit, wherein each electrical lead of the pair of electrical leads are spaced apart from one another, and wherein the pair of electrical leads cooperate to stand off a rear surface of the directional wideband microphone and a rear surface of the preamplifier from a surface of the aftermarket telematics unit.

14. The microphone assembly of claim 13, wherein the directional wideband microphone has an acoustic axis and wherein the directional wideband microphone is oriented within the chamber such that the acoustic axis is directed through the opening and towards the rear of the vehicle in a direction that is at least substantially perpendicular to a front face of the aftermarket telematics unit.

15. The microphone assembly of claim 13, further comprising a grill member positioned to cover the opening, the grill member having a plurality of grill openings that are sized to render the grill member acoustically transparent.

16. The microphone assembly of claim 15, wherein the plurality of grill openings comprise substantially parallel slots.

17. The microphone assembly of claim 13, wherein the directional wideband microphone is disposed within the chamber such that a rear surface of the directional wideband microphone is spaced apart from any other surface.

18. The microphone assembly of claim 17, wherein the directional wideband microphone is spaced apart from any other surface by at least two millimeters.

19. The microphone assembly of claim 13, further comprising;

a foam body disposed within the chamber, the foam body being positioned between the directional wideband microphone and the opening, the foam body having a density that is effective to resist transmission of sound energy of a predetermined frequency; and a boot positioned around the directional wideband microphone, the boot being acoustically transparent, the boot comprising an elastomeric material, and an outer surface of the boot being contoured to substantially conform to an internal portion of the chamber.

20. A microphone assembly for use with an aftermarket telematics unit mounted in a passenger compartment of a vehicle, the aftermarket telematics unit having a Printed Circuit Board (PCB board) to control various functions of the aftermarket telematics unit, the aftermarket telematics unit further having a chamber having an opening that generally faces towards a rear of the vehicle, the microphone assembly comprising:

a directional wideband microphone disposed within the chamber and having an acoustic axis, the directional wideband microphone being oriented within the chamber such that the acoustic axis is directed through the opening and towards the rear of the vehicle;

a preamplifier mounted at least partially within the directional wideband microphone, the preamplifier having a pair of electrical leads for both electrically connecting and structurally attaching to the PCB board, a grill member positioned to cover the opening, the grill member having a plurality of grill openings that are sized to render the grill member acoustically transparent;

a foam body disposed within the chamber, the foam body being positioned between the directional wideband microphone and the opening and the foam body having a density that is effective to resist a transmission of sound energy of a predetermined frequency; and a boot positioned around the directional wideband microphone, the boot being acoustically transparent, the boot comprising an elastomeric material, and an outer surface of the boot being contoured to substantially conform to an internal portion of the chamber, wherein the directional wideband microphone and the preamplifier are mounted to the aftermarket telematics unit via the pair of electrical leads such that the pair of electrical leads are the sole points of attachment of the directional wideband microphone and the preamplifier with the aftermarket telematics unit, wherein each electrical lead of the pair of electrical leads are spaced apart from one another, wherein the pair of electrical leads cooperate to stand off a rear surface of the directional wideband microphone and a rear surface of the preamplifier from a surface of the aftermarket telematics unit and wherein the directional wideband microphone is disposed within the chamber such that a rear surface of the directional wideband microphone is spaced apart from any other surface by at least two millimeters.

* * * * *